May 15, 1923.
E. P. BULLARD, JR
1,455,283
ELECTRIC OPERATING CHUCKING DEVICE
Filed Sept. 4, 1920 3 Sheets-Sheet 3
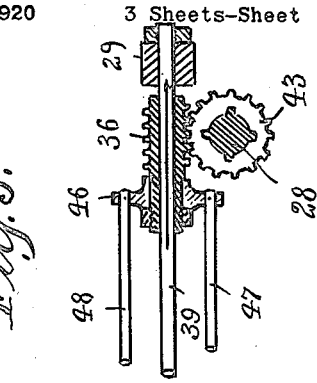
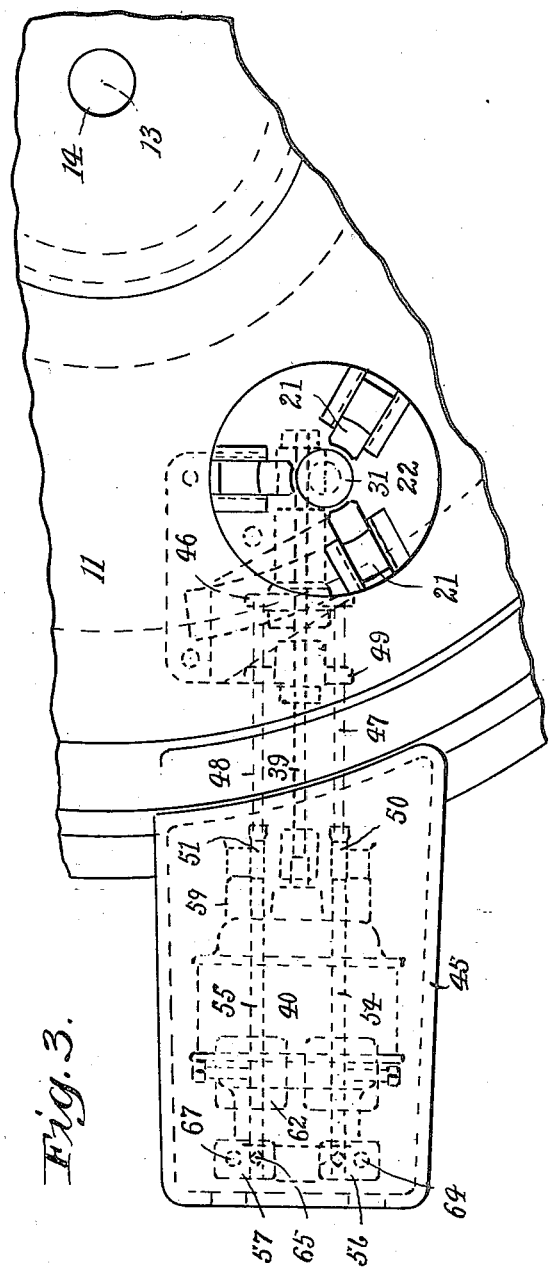
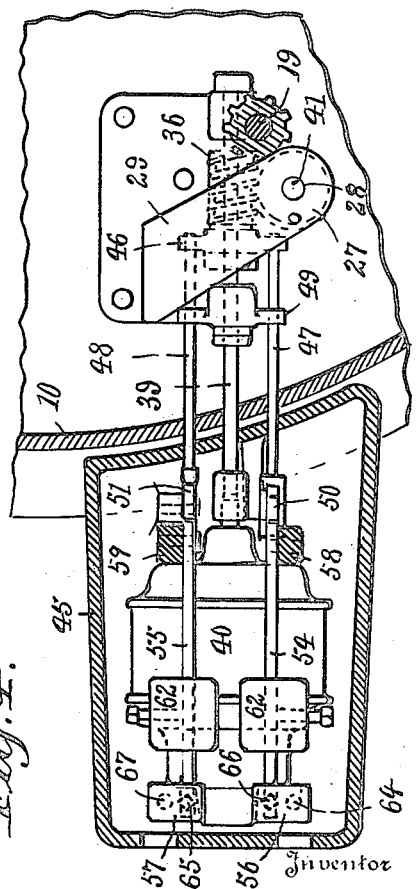
Inventor
Edward P. Bullard Jr.
By Chamberlain & Newman
Attorneys Patented May 15, 1923.

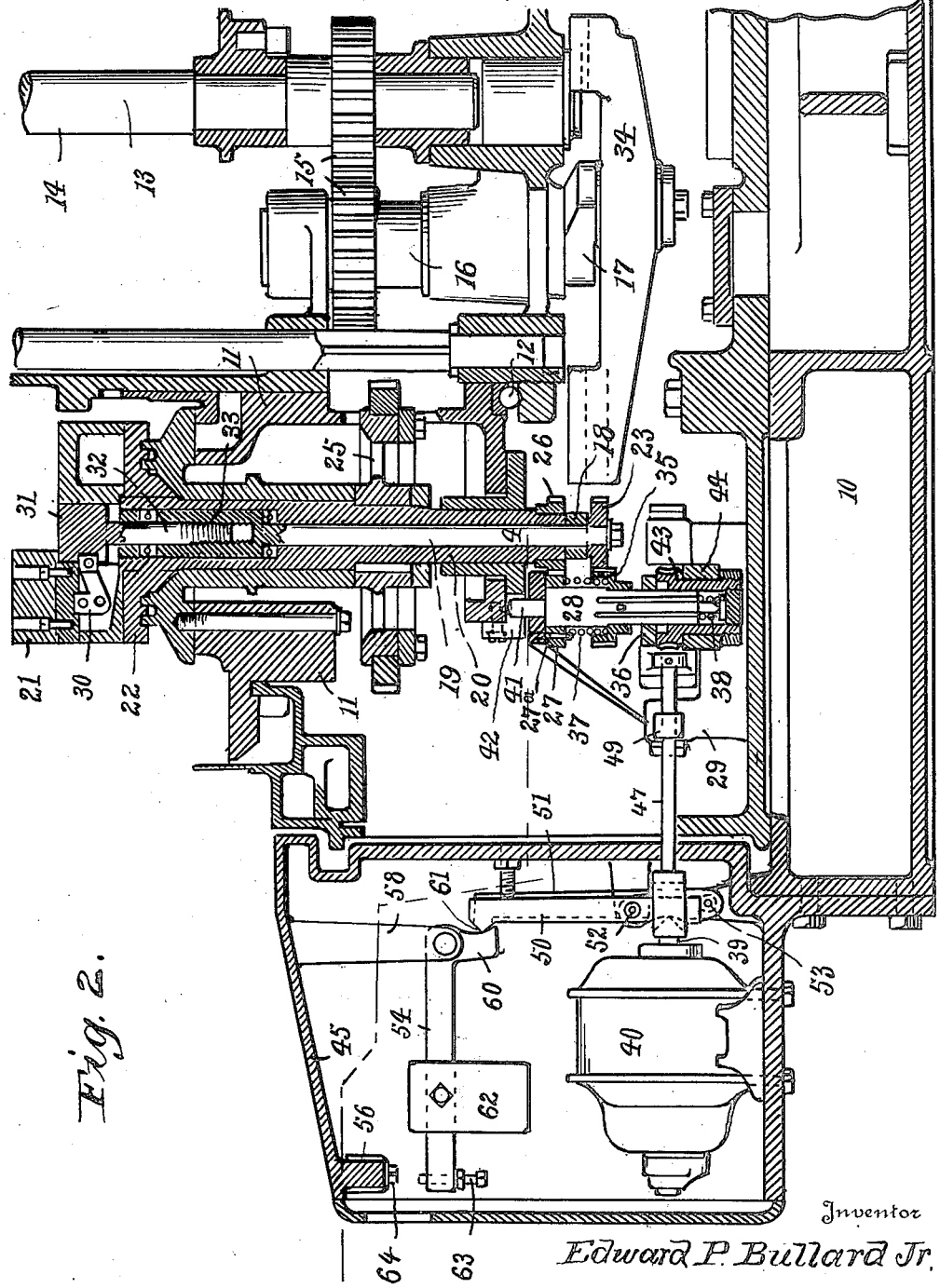

1,455,283

UNITED STATES PATENT OFFICE.

EDWARD P. BULLARD, JR., OF BRIDGEPORT, CONNECTICUT, ASSIGNOR TO THE BULLARD MACHINE TOOL COMPANY, OF BRIDGEPORT, CONNECTICUT, A CORPORATION OF CONNECTICUT.

ELECTRIC-OPERATING CHUCKING DEVICE.

Application filed September 4, 1920. Serial No. 408,243.

*To all whom it may concern:*

Be it known that EDWARD P. BULLARD, Jr., a citizen of the United States, and resident of Bridgeport, in the county of Fairfield and State of Connecticut, has invented certain new and useful Improvements in Electric-Operating Chucking Devices, of which the following is a specification.

This invention relates to an electrically operated device for locking and unlocking chuck jaws on single or multiple spindle machines and includes both manual and automatic controlling means.

Upon the accompanying drawings I have shown the invention applied to a multiple spindle machine, known as a "Bullard mult-au-matic," which as shown includes a series of six rotary work tables mounted in a carrier that revolves around an axis, which carrier moves the tables from one work station to another. This machine thus includes six stations comprising five work stations, beneath the tool slides. The chucks upon the tables are opened and closed when they become positioned at the loading station, to permit the removal and replacement of work.

The purpose of the invention therefore is to provide a novel power means for operating these chucks, while the tables are at their loading station, by first opening and then closing and to accomplish this in a positive and reliable manner. Further, to provide automatic controlling means for interrupting the power at the instant of closing the jaws on the work and for opening the jaws to release the work, so it can be readily picked up, laid aside, and replaced by another similar piece, and further to provide a chuck operating mechanism within the several table spindles which in case of an emergency may be operated independent of the power operating device.

Other objects are to provide manually controlled means whereby the electric power may be quickly applied to close the jaws against the work, to grasp and hold the same, and to provide means whereby the pressure of the chuck jaws upon the work may be varied to suit the nature of the work, and further so that the pressure applied to the work at the loading station is maintained throughout the period of operation.

Another feature of the invention is to provide a chucking device of the above class which can readily be applied to the commercial type of multiple spindle machines referred to, and with comparatively little change or alteration in the construction of the machine, and especially to provide means whereby the chuck jaws carried on each table may be operated through the center of the table spindle upon which they are carried and whereby the application of power thereto is vertical or at right angles to the line of movement of the jaws. I preferably employ three jaws upon each table, which as herein shown are arranged to operate radially and to work either contractingly or expandingly.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Fig. 1 shows a sectional plan view of a "Bullard mult-au-matic" type of multiple spindle machine, and to which I have shown my invention applied.

Fig. 2 shows an enlarged vertical section of the said machine and invention through the loading station as the same would appear when seen on line 2—2 of Fig. 1.

Fig. 3 is a similar enlarged plan view of that portion of the machine and improvement as shown in Fig. 2.

Fig. 4 is a further sectional plan view of the said invention as indicated on line 4—4 of Fig. 2, and Fig. 5 shows a sectional plan of the worm gear, worm and shaft upon which the worm is slidably mounted.

Figure 1:
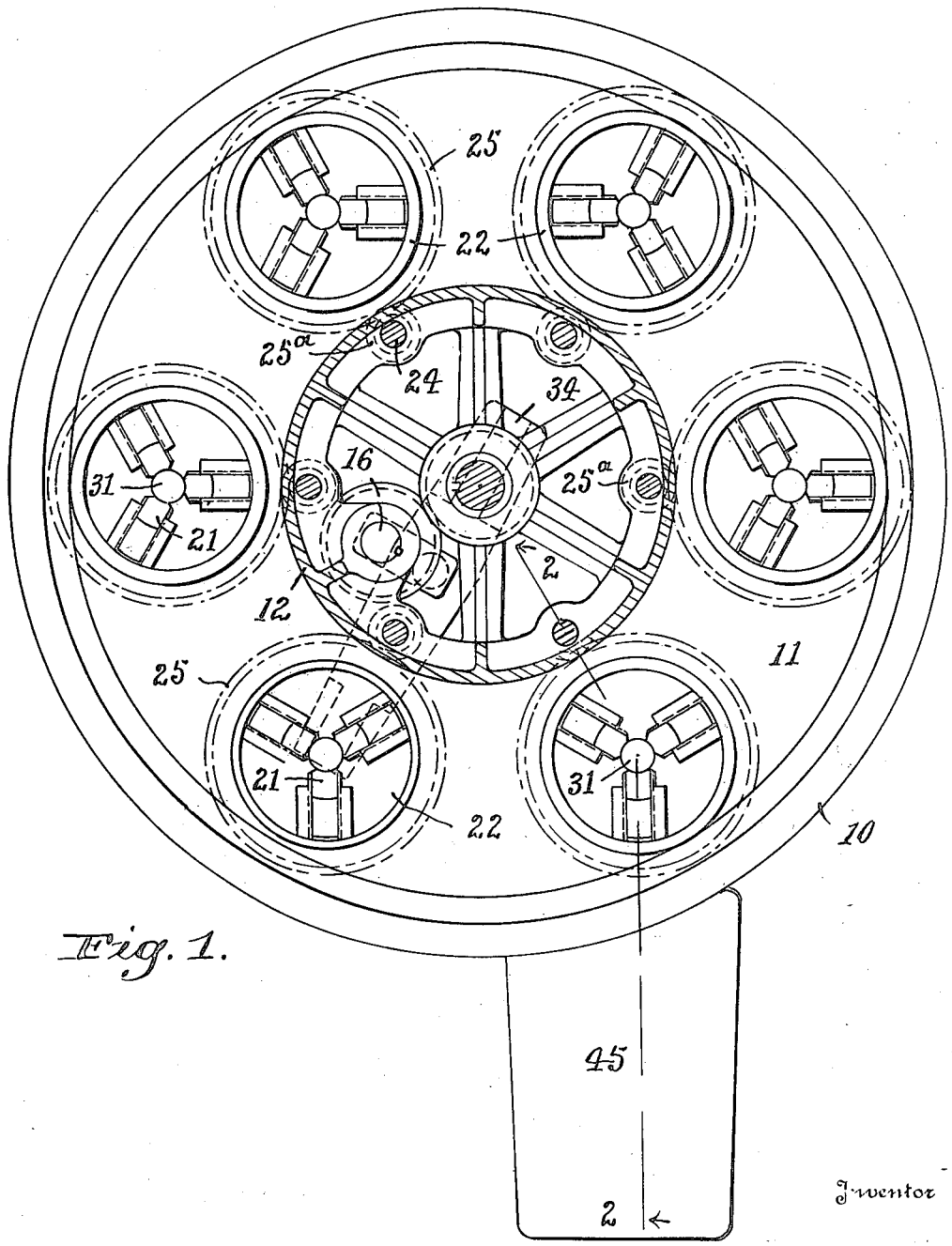

The multiple spindle machine referred to herein as a "Bullard mult-au-matic" and to which my invention is applied, is shown and described in several patents, as for instance Patent No. 1,258,089. This mult-automatic is a large capacity machine, which when operating on ordinary work can be handled by a single operator, whose principal duties are to stand in front of the machine, at the loading station, and to remove and replace the work upon the several rotary work carrying tables as they come forward with the indexing of the carrier.

The starting of the carrier, which moves the tables from one station to another, is performed by the manual operation of a starting lever, not shown, manipulated by the operator, positioned in front of the loading station. This operator has also heretofore operated the chuck jaws by means of a hand wrench, so as to first release the finished work, and then to grip the new piece, which operations necessarily consume time, add to the fatigue of the operator and thus reduce the efficiency of the machine.

The several rotary tables are mounted in the carrier revolvably mounted on the base of the machine, and are provided with mechanisms for moving the carrier a given distance with each operation so as to bring the respective work tables beneath the tool carrying slides, not shown, but which are operated from mechanisms contained within the upper part of the machine, and designed to simultaneously operate upon work carried by all five of the rotating work tables while the work upon the sixth or non-rotating table is being removed and replaced. With each complete turn of the carrier and cycle of operations one finished piece of work is produced and with each stopping of the machine the finished piece of work is removed and another rough casting placed upon the table at the loading station.

In the drawings 10 represents the base of a commercial type of mult-au-matic machine and 11 a carrier rotatably mounted to turn upon the ball bearings 12 around the axis designated by the center 13. 14 indicates the main centrally positioned operating shaft having a grear connection 15 with the crank shaft 16, bearing crank 17 which actuates the indexing arm 34 designed to alternately engage the roller 18 on each of the thrust spindles 19 mounted in the table spindles 20. By this means the carrier and its several table spindles are indexed by being revolved one-sixth of a turn and so as to move all the tables simultaneously and from one series of stations to the next.

The work tables as shown in the accompanying drawings are very similar to those employed in the earlier type of mult-au-matic machine, except that they have now been made hollow to accommodate the thrust spindle 19 through which the chuck jaws 21 are operated. 22 represents the rotary tables mounted on the spindles 20 which are fitted to turn in bearings of the carrier and are each provided with a gear 25 by means of which they are rotated while at their several work stations. These gears 25 and spindles are driven from the shafts 24 through the gears 25ª on said shafts. A locking gear 26 is also secured to the lower end portion of each table spindle in position to register with the non-rotatable segment 27 slidably mounted on the vertically movable shaft 28 carried in the bracket 29 attached to the base of the machine, so as to insure the meshing of a gear 26 with the segment at each stoppage of the table spindle at the loading station, in a way to prevent rotation of the particular table at the loading station while the chuck is being opened or closed.

The chuck jaws 21 are slidably mounted to be moved radially and are each connected by a pivoted bell crank lever 30 with a slidable head 31 whose threaded shank 32 extends into the tapped head 33 on the thrust spindle 19 before mentioned, so that the turning of the thrust spindle in one direction will draw the head and jaws in and the turning of the spindle in the opposite direction will run the jaws out.

On the lower end of the thrust spindle 19 is mounted the indexing roll 18 with which the indexing arm 34 engages when indexing the carrier 11. The gear 23 is mounted on the lower end of the thrust spindle for the purpose of driving the same when engaged by the driving gear 35 mounted on the movable shaft 28.

From the foregoing it will be obvious that the single power unit serves to operate each of the above mentioned sets of chucking jaws when brought to the loading station and in engagement with said power unit. This power gear mechanism for operating the thrust spindle in its forward and reverse movements, is supported in the before mentioned bracket 29, positioned adjacent to the loading station. This drive unit comprises vertically movable shaft 28, a worm 36, worm gear 43, driving gear 35, springs 37 and 38, worm shaft 39 and motor 40, etc.

The shaft 28 of the driving unit is held in its normally raised position by means of the spring 38 seated against its lower end, so that the extension 41 will be exposed for engagement by the cam 42 secured to the carrier, and so that as the table spindles approach the loading station, the cam on the carrier will engage and depress the vertical shaft, preparatory to the intermeshing of the gears.

This shaft is splined to, but is free to move longitudinally in the worm gear 43 rotatably mounted in the lower member 44 of the bracket 29. The segment 27, which locks the table spindle is loose on the shaft and is itself supported by spring 37 positioned around the shaft and upon the driving gear 35. This last named spring 37 is of a limited tension to yieldably support the segment in a way to allow it to move down by gravity with the lowering of the shaft 28. The locking segment 27 is prevented from rotating by being slidably connected with a pin 27ª secured in bracket 29, and is adapted to be engaged and disengaged by the said locking gears. The gear 35 is rigidly mounted on the shaft 28 and is depressed with the lowering of the same by the cam 42 on the carrier, and is again raised into mesh with the gear 23 after the tables become positioned, by lower spring 38 as soon as the cam has passed the extension 41, thus insuring both sets of gears coming into engagement at the loading station, it being obvious of course that the said gears roll out of engagement when the indexing starts to move the newly loaded table to the first work station.

The mechanism comprising the power unit is in part contained within the base of the machine adjacent to the loading station and in a special housing 45 attached to the front of the base of the machine to enclose the motor 40, weigh beams, and electric controlling means. The motor is bolted to the floor of the housing and is coupled to align with the worm shaft 39 whose inner end portion is squared to receive the worm 36 which is free to move axially thereon but is rotatably driven thereby. This worm obviously meshes with and drives the before mentioned worm gear 43 which in turn drives the vertically movable shaft 28 provided with longitudinal grooves to mesh with corresponding longitudinal ribs in the hub of the worm gear. Upon one end of the worm is mounted a yoke 46 carrying two thrust rods 47 and 48 which are reciprocatorily mounted in the bearing 49 of the bracket 29, and serve to actuate the multiplying levers 50 and 51 pivotally supported at 52 and 53 on the housing 45 and connected to support and operate weigh beams 54 and 55.

The purposes of the slidable worm, thrust rods, and multiplying levers and weights are to form an adjustable and automatic operating means for the motor switches 56 and 57, to provide the desired pressure to be exerted upon the jaws of the chuck so that the final resistance, afforded by a chucking operation, may be utilized to stop the motor, when the chucks have been properly opened or closed. The weigh beams which are pivoted to the hangers 58 and 59 are each provided with a depending arm 60 that is engaged by the bearing points 61 of the multiplying levers. The weights 62 mounted upon the weigh beams are adjustable, to provide different loads or resistance to the operation of the chucks. The outer ends of these weigh beams are provided with adjustable screws 63 that are positioned in alignment with the push buttons 65 and 66 of the switches 56 and 57. 64 and 67 represent starting push buttons in each switch by means of which the motor is started forward or backward. The lever 50 which is pivoted at 52 is a lever of the first class and is operated by the forward movement of the thrust rod 47, caused by the resistance to the chuck jaws and the consequent sliding movement of the worm in one direction, while the lever 51 is of the third class, is pivoted below and is operated by the reverse movement of the thrust rod 48 when exerted against the lever between the points of the pivot and load, and caused by the resistance to the jaws and the sliding movement of the worm in opposite direction when operating in the reverse direction.

The cycle of operations of this device is as follows: As a table reaches the loading station the gear 35 and segment 27 of the drive unit automatically engage the gears 23 and 26, respectively, on the spindles. Whereupon to unlock a contracted jaw chuck, the operator presses push-button 64 of the switch 56 thereby starting the motor, driving the worm shaft, worm, and worm gear. This gear in turn operates the shaft 28 driving the gear 35 and the gear 23 thereby turning the thrust spindle in a manner to open the chuck. In this connection it should be borne in mind that the table spindle has been locked against rotation by the engagement of its gear 26 with the fixed segment 27. When the chucks have been opened wide the resistance thereof causes the worm and thrust rods to slide in a manner to operate the weigh beam 54 and push button 66 to automatically stop the motor when the chuck is wide open. The operator then removes the finished part and places a new piece on the table. The push button 67 on switch 57 is next operated to start the motor for locking the chuck. When the resistance of the jaws reaches a predetermined point in the locking operation, the worm slides on its shaft, carrying the yoke and thrust rods which in turn operate the multiplying levers 51 to raise the weigh beam 55 so that its screw will engage the push button 65 and operate the switch 57 and thereby stop the motor. The spindle then automatically indexes out of engagement with the drive unit, leaving the same idle until another table comes forward.

From the foregoing disclosure it will be apparent that with slight modifications in details of construction the invention can be applied for the operation of a chuck on various forms of single spindle machines such as boring mills, vertical turret lathes, or the like, and including one rotary work supporting table carried upon a single spindle.

What I desire to claim is:

1. The combination with a rotary work carrying table having a spindle, of a series of slidable jaws mounted thereon, connections through the table spindle with the jaws for opening by movement in one direction, and closing the jaws by movement in the opposite direction and including a member fixed against longitudinal movement in said spindle and rotatable axially thereof, a spur gear on said member, a spur gear adapted to be meshed and unmeshed therewith through movement of the table, and means for driving said last mentioned spur gear in opposite directions to open and close the jaws.

2. In a chucking device the combination with a rotary work carrying table and a series of radially operatable chuck jaws, of an operating member slidably mounted axially within the table at a right angle to the movement of the jaws, a lever member connecting the chuck jaws and slidable member, and power connections with the operating member in the table spindle for operating the jaws.

3. A multiple spindle machine comprising a carrier, rotary work tables mounted therein, chuck jaws on the rotary tables, an electric motor for operating the jaws to grip and release the work, and resistance operated means for automatically stopping the motor when the chuck jaws have been opened or closed.

4. In a multiple spindle machine having a loading station and including a rotatable carrier, a series of rotatable tables mounted thereon, and radially movable chuck jaws in each table, of forward and reversably movable jaw operating means in each table, comprising a vertically reciprocating rod having operative connections with the jaws, and a rotatable member having threaded connection with said rod to rotate it, a power unit and means adapted to automatically mesh said power unit with said rotatable members of the respective tables, as the same become positioned at the loading station of the machine to open and close the jaws by movement of said operating means in forward and reverse directions respectively.

5. In a multiple spindle machine having a loading station and including a rotatable carrier, a series of rotatable tables mounted thereon, and radially movable chuck jaws in each table, of forward and reversably movable jaw operating means in each table, comprising a vertically reciprocating rod having operative connections with the jaws, and a rotatable member having threaded connection with said rod to rotate it, a power unit, means adapted to automatically mesh said power unit with said rotatable members of the respective tables, as the same become positioned at the loading station of the machine to open and close the jaws by movement of said operating means in forward and reverse directions respectively and resistance operated means for cutting off power when the jaws have been stopped in their work gripping movement through contact with the work.

6. The combination with a multiple spindle machine including a rotatable carrier, a series of rotatable tables mounted therein, and chuck jaws carried upon the tables, of forward and reversably movable jaw operating means carried in each table including a gear, a power unit for operating the chuck jaws on the respective tables and including a rotatable and axially movable gear, means for automatically moving said last gear axially to mesh it with said first gear as the work tables are brought to the loading station to open or close the jaws by movement of said operating means in forward and reverse directions respectively.

7. The combination of a multiple spindle machine including a rotatable carrier, a series of rotatable tables mounted therein and provided with spindles through which they are rotated, chuck jaws in each table, a forward and reversably movable chuck jaw operating means mounted in the table spindle, a power unit for operating the chuck jaws to open and close them by movement of the operating means in forward and reverse directions respectively, gearing between the power unit and the operating means adapted to be automatically brought into mesh as the carrier is brought to loading and unloading position, and means adapted to be automatically operated through the meshing of said gearing to hold the table spindle against rotation during the chucking operation.

8. In a chucking device, the combination of a rotary work carrying table, a series of radially operable chuck jaws mounted in the table, a centrally positioned slidable head, bell-cranks connecting the several jaws and the sliding head, a thrust spindle mounted within the table spindle and operatively connected to the slidable head to transmit thereto longitudinal movement in two directions for the operation of the chuck jaws to opened or closed positions respectively, and means for rotating the thrust spindle.

9. A chucking device for work carrying tables, comprising gripping jaws, an operating member connected therewith, a motor for driving the operating member, a yieldable driving connection between the motor shaft and operating member, a pressure resistance operating device connected with the yieldable driving connections, and electric controlling means adapted to be automatically operated by the resistance operating device whereby the motor is automatically stopped by the resistance to the jaws when in their extreme operated positions.

10. A chucking device for rotary work carrying tables, comprising a gripping jaw, an operating member connected with the jaw, a motor for driving the operating member, a yieldable driving connection between the motor shaft and operating member, a yieldable load resistance device connected with the driving connections, and electric control means adapted to be operated by the resistance operating device whereby the motor is automatically stopped by a certain resistance to the jaws when in their extreme open or closed positions.

11. The combination with a rotary work carrying table including a spindle, of a series of chuck jaws slidably mounted in the table, a reciprocating member operatively connected with the chuck jaws, an operating spindle mounted in the table spindle and connected with the reciprocating member to operate the same, a motor for driving the operating member to open and close the jaws, and an automatic electric stop for stopping the motor when the jaws have been operated.

12. A chucking device for rotary work carrying tables, comprising slidable jaws, an operating member slidably mounted in the table at a right angle to and connected with the jaws for operating the same, a motor for driving the operating member, an electric control switch for the motor, means connected with the chuck jaw operating mechanism for automatically operating the switch through the resistance of the jaws in their extreme operated positions.

13. A chucking device for rotary work carrying tables, comprising gripping jaws, an operating member slidably mounted in the table at a right angle to and connected with the jaws for operating the same, a motor for driving the operating member, driving connections from the motor to the operating member, a motor control switch, a switch operating device connected with the driving connections and designed to be operated by the extreme resistance to the operation of the chuck jaws.

14. A chucking device for rotary work carrying tables, comprising slidable jaws, an operating member slidably mounted in the table at a right angle to and connected with the jaws for operating the same, a motor for driving the operating member, a yieldable driving connection between the motor and operating member designed to yield with the setting of the jaws, a pressure resistance device connected with the yieldable part of the driving connections, and electric means for starting the motor and adapted to be automatically operated by the resistance operating device whereby the motor is automatically stopped by the resistance to the jaws when in their extreme operated positions.

15. In a chucking device, the combination with a rotatable carrier, a series of rotary work carrying tables mounted therein, a series of chuck jaws operatively mounted in each table, means within each table spindle connected with the respective jaws for operating the same, a single electro motor power unit with which the chuck jaw operating mechanism register when brought to the loading station, manually operable means for starting the operation of the power unit, and means adapted to automatically shut off power to the electric motor at a predetermined point.

16. In a chucking device, the combination with a rotary carrier, a series of rotary work tables mounted therein, a series of chuck jaws mounted therein and adapted to operate contractingly and expandingly, of a centrally arranged slidable operating member with which the several jaws are connected, a spindle connected with the central operating member to transmit thereto longitudinal movement, a power unit connected with the spindle to drive the same, and means for controlling the operation of the power unit by the operation of the chuck jaws.

17. The combination with a rotary work carrying table having a spindle and slidable jaws mounted upon the table, connections through the table spindle for operating the jaws including a head having a threaded shank, a rotatable thrust spindle connected with the shank for transmitting thereto longitudinal movement, a driving unit connected with the rotatable thrust spindle for operating the same, and means connected with the driving unit for disengaging the same at predetermined loads for automatically disengaging the power.

18. In a power chucking device, the combination with a rotary work table and a series of radially operatable chuck jaws, of jaw operating means contained within the table including in part a rotatable thrust spindle, a power unit for operating the thrust spindle including a driving shaft, a worm and gear connection with the thrust spindle, said worm being mounted to slide upon the driving shaft under excessive loads and connections with the gear for releasing the power through the movement of said sliding gear.

19. In a power chucking device, the combination with a rotary work carrying table and a series of radially operatable chuck jaws, of jaw operating means within the table including in part a rotatable thrust spindle, a power unit for operating the thrust spindle including in part an electric motor, worm and gear connections for operating the chuck jaws, said worm being slidably mounted upon the motor shaft and normally held under a given tension to operate the jaws to a given pressure, means for regulating the tension to determine the load under which the worm is to operate, and means for automatically stopping the motor when said predetermined action of the jaws has taken place.

20. In a chucking device, a series of movable jaws, a table on which the jaws are mounted, and automatic means for causing the jaws to move from and toward each other for predetermined distances.

21. In a chucking device, a series of radially operatable chuck jaws, a table on which the jaws are mounted, forward and reversably operable means for causing said jaws to move from or toward each other, and automatic means for regulating the extent of movement of said jaws in either direction.

22. In a chucking device, a series of radially operable chuck jaws, a rotatable table on which the jaws are mounted, a spindle positioned in said table, forward and reversably operable means for actuating said spindle to cause said jaws to move from and toward each other, and automatic means for regulating the extent of movement of said jaws.

23. In a chucking device, a rotatable work carrying table, a series of chuck jaws slidably mounted therein, a forward and reversably movable reciprocating member operatively connected with the chuck jaws and a rotatable spindle connected with the reciprocating member in one of the other directions to actuate said member to cause the jaws to move from or toward each other.

24. In a chucking device, a rotatable table, chuck jaws slidably mounted thereon, a forward and reversably operable reciprocating member operatively connected with the chuck jaws, and a rotatable member connected with the reciprocating member and adapted to cause said last mentioned member to reciprocate in said table to move said jaws from or toward each other, the connection between said reciprocating member and rotatable member being a threaded one, as described.

25. In a chucking device, a rotatable table, chuck jaws slidably mounted thereon, a forward and reversably operable reciprocating member slidable in said table and operatively connected with said chuck jaws to cause them to move from and toward each other by movement in one or the other directions, an operating member having a threaded connection with said reciprocating member, and means for causing said operating member to be rotated in either direction for predetermined distances to cause said reciprocating member to actuate said chuck jaws.

26. The combination of a multiple spindle machine including a rotatable carrier, a series of rotatable tables mounted therein and provided with spindles to which the tables are rigidly secured, means for rotating said spindles, chuck jaws in each table, chuck jaw operating means in said table spindles, a power unit for operating the chuck jaw operating means, and means on the carrier whereby a spindle is held against rotation when the power unit is operating.

27. The combination with a power unit including an electric motor, of a worm mounted to slide upon the motor driving shaft, operating mechanism connected with the worm, an electric switch for starting and stopping the motor, an arm to operate the switch to stop the motor, a lever connected with said arm to operate the same, and connections intermediate of the lever and worm whereby the said lever is operated by the sliding movement of the worm to automatically operate the switch and stop the motor.

28. The combination with a power unit including an electric motor, of a worm mounted to slide upon the motor driving shaft, operating mechanism connected with the worm, slide rods connected with the worm, a lever connected with each slide rod, one lever operated by the forward movement of one rod and the other operated by movement of the other rod in the reverse direction, a weigh beam connected with each of the said levers, and an electric switch operated by each of the weigh beams to stop the motor by the resistance of an excessive load on the worm.

29. The combination with a multiple spindle machine including a rotatable carrier, a series of rotatable tables mounted therein, a set of chuck jaws carried by each table, a table spindle for each table, and a thrust spindle for each set of chuck jaws, of chuck jaw operating means carried by each table and a power unit for actuating the chuck jaw operating means, said chuck jaw operating means including a slidable, non-rotatable segment, means for causing said segment to move into and roll out of holding position with respect to a table spindle, a longitudinally movable shaft carrying a gear, and means for causing said gear to become operatively connected with said thrust spindle to cause the same to be rotated.

30. The combination with a multiple spindle machine including a rotatable carrier, a series of rotatable tables mounted therein, a set of chuck jaws carried by each table, a table spindle for each table, and a thrust spindle for each set of chuck jaws, of chuck jaw operating means carried by each table and a power unit for actuating the chuck jaw operating means, said chuck jaw operating means including a slidable, non-rotatable segment, means for causing said segment to move into and roll out of holding position with respect to a table spindle, a longitudinally movable shaft carrying a gear, and means for causing said gear to become operatively connected with said thrust spindle to cause the same to be rotated, and said power unit including means whereby said thrust spindle can be caused to be alternately rotated in opposite directions for predetermined distances.

31. The combination with a work carrying table, of chuck jaws provided on said table, electro motor driven means for moving said jaws toward and away from each other, a manually operable switch for initiating such movements, and automatic switch operating means adapted to be operated through resistance to the movement of the jaws.

32. The combination with a work carrying table, of chuck jaws carried thereby, operating means operable in forward and reverse directions to open and close said clutch jaws, and a reversable electric motor having an armature adapted to be driven in opposite directions for driving said operating means and two control switches for selectively operating said motor.

Signed at Bridgeport, in the county of Fairfield and State of Connecticut, this 30th day of August, A. D. 1920.

EDWARD P. BULLARD, Jr.

Witnesses:
F. J. LYNCH,
G. F. HOLT.